United States Patent

[11] 3,609,226

[72] Inventor Donald R. Thompson
Woodstock, N.Y.
[21] Appl. No. 815,308
[22] Filed Apr. 11, 1969
[45] Patented Sept. 28, 1971
[73] Assignee International Business Machines Corporation
Armonk, N.Y.

[54] DATA COMPACTOR
4 Claims, 6 Drawing Figs.

[52] U.S. Cl. .......... 178/6, 178/DIG. 2, 178/DIG. 3
[51] Int. Cl. .......... H04n 1/40, H04n 1/06, H04n 7/12
[50] Field of Search .......... 178/DIG. 2, DIG. 3

[56] References Cited

UNITED STATES PATENTS

| | | | |
|---|---|---|---|
| 3,243,507 | 3/1966 | Macovski | 178/6 |
| 3,462,547 | 8/1969 | Macovski | 178/7.1 |

*Primary Examiner*—Robert L. Griffin
*Assistant Examiner*—Richard K. Eckert, Jr.
*Attorney*—Hanifin and Jancin

ABSTRACT: A data encoder which compacts the data necessary for recording the lines on a document by scanning a set of contiguous regions of equal area. The data compactor examines first a region group of two regions in one direction. A second comparator then examines three of these outputs for two regions in a second perpendicular direction and produces an output dependent upon their content. Storage means then record the output of the second comparator.

INVENTOR
DONALD R. THOMPSON

BY James David Jacobs
AGENT

CHART 1

| | $a_{11}$ | $a_{12}$ | $b_{11}$ | $b_{12}$ | $c_{11}$ | $c_{12}$ | $d_{11}$ | $d_{12}$ | $e_{11}$ |
|---|---|---|---|---|---|---|---|---|---|
| OUTPUT OF PHOTOCELL 119 | 0 | 0 | 0 | 1 | 0 | 0 | 0 | 0 | 1 |
| OUTPUT OF PHOTOCELL 121 | 0 | 0 | 1 | 0 | 0 | 0 | 0 | 0 | |
| OUTPUT OF CIRCUIT BLOCK 202 (REGISTER 253 BEFORE TIMING PULSE 133D, THEN REGISTER 255) | 0 | 0 | 0 | 1 | 0 | 0 | 0 | 0 | |

CHART 2

| | $a_{11}$ | $a_{12}$ | $b_{11}$ | $b_{12}$ | $c_{11}$ | $c_{12}$ | $d_{11}$ | $d_{12}$ | $e_{11}$ |
|---|---|---|---|---|---|---|---|---|---|
| | $a_{21}$ | $a_{22}$ | $b_{21}$ | $b_{22}$ | $c_{21}$ | $c_{22}$ | $d_{21}$ | $d_{22}$ | $e_{21}$ |
| OUTPUT OF PHOTOCELL 119 | 1 | 1 | 1 | 1 | 0 | 0 | 0 | 0 | 0 |
| OUTPUT OF PHOTOCELL 121 | 1 | 1 | 1 | 0 | 0 | 0 | 0 | 0 | |
| OUTPUT OF CIRCUIT BLOCK 202 (REGISTER 251) | 1 | 1 | 1 | 1 | 0 | 0 | 0 | 0 | 0 |

CHART 3

| | $a_{21}$ | $a_{22}$ | $b_{21}$ | $b_{22}$ | $c_{21}$ | $c_{22}$ | $d_{21}$ | $d_{22}$ | $e_{21}$ |
|---|---|---|---|---|---|---|---|---|---|
| OUTPUT OF PHOTOCELL 119 | 1 | 1 | 1 | 1 | 0 | 0 | 0 | 0 | 0 |
| OUTPUT OF PHOTOCELL 121 | 1 | 1 | 1 | 0 | 0 | 0 | 0 | 0 | |
| OUTPUT OF CIRCUIT BLOCK 202 (REGISTER 253) | 1 | 1 | 1 | 1 | 0 | 0 | 0 | 0 | |

CHART 4

| | | | | | | | | |
|---|---|---|---|---|---|---|---|---|
| REGISTER 255 | 0 | 0 | 0 | 1 | 0 | 0 | 0 | 0 |
| REGISTER 251 | 1 | 1 | 1 | 1 | 0 | 0 | 0 | 0 |
| REGISTER 253 | 1 | 1 | 1 | 1 | 0 | 0 | 0 | 0 |
| OUTPUT OF 271 | 0 | 0 | 0 | 1 | 0 | 0 | 0 | 0 |

CHART 5

| | | | | | | | | |
|---|---|---|---|---|---|---|---|---|
| REGISTER 255 | 0 | 0 | 0 | 1 | 0 | 0 | 0 | 0 |
| REGISTER 251 | 0 | 0 | 0 | 1 | 0 | 0 | 0 | 0 |
| REGISTER 253 | 0 | 0 | 0 | 1 | 0 | 0 | 0 | 0 |
| OUTPUT OF 271 | 0 | 0 | 0 | 1 | 0 | 0 | 0 | 0 |

CHART 6

| | | | | | | | | |
|---|---|---|---|---|---|---|---|---|
| REGISTER 255 | 1 | 1 | 0 | 1 | 0 | 0 | 0 | 0 |
| REGISTER 251 | 1 | 1 | 0 | 1 | 0 | 0 | 0 | 0 |
| REGISTER 253 | 0 | 1 | 1 | 1 | 0 | 0 | 0 | 0 |
| OUTPUT OF 271 | 1 | 1 | 0 | 1 | 0 | 0 | 0 | 0 |

FIG. 6

DATA COMPACTOR

RELATED INVENTIONS

U.S. application Ser. No. 762,517, filed Sept. 25, 1968, "-Method and Scanning Apparatus for Color Separation and Identification," by Donald R. Thompson. U.S. application Ser. No. 791,274, filed Jan. 15, 1969, "Color Encoder," by John V. Sharp. U.S. application Ser. No. 815,444 filed on the same day as the instant application, "Compact Color Encoder," by Donald R. Thompson and John V. Sharp.

BACKGROUND OF THE INVENTION

The invention relates to telephony systems and more particularly to systems where the frequency bandwidth is compressed through data compression.

DESCRIPTION OF THE PRIOR ART

In the scanning of a document composed of intersecting and parallel lines the scanning system must not only resolve all the lines present, but also store their relative positions. A scan head of approximately the same size as the lines to be scanned, i.e. a scan head of 4 mils × 4 mils for a line that has a width of 4 mils, presents numerous problems. If the scan head happens to bisect the line it is scanning so that only a width of 2 mils of the line is detected, the scan head might or might not register the presence of a line. Similarly, when the other half of the line is later scanned that scan might or might not also register a line present. Therefore, in this particular circumstance there is one-quarter probability that the line will not be detected. Further, if the line does not have an exact width of 4 mils, but happens to have a variation of as little as 25 percent, the probability of not detecting the presence of a line increases drastically.

The prior art has attempted to overcome this fault by making sure that the width of the line is at least 50 percent greater than the width of the scan head. The outputs of the scan head must be recorded to preserve the information that is detected on the document. Thus, because the prior art uses relatively small scan heads in relationship to the information scanned (the relatively wide lines on the document), a tremendous amount of data is generated (one bit for each region scanned) in relationship to the information content of the document.

Therefore, it is an object of this invention to compact the data necessary to record the presence or absence of a line without increasing the probability that a line on the document will not be detected.

SUMMARY OF THE INVENTION

The invention reduces the amount of digital data necessary to represent the lines on a document without increasing the probability of nondetection of certain lines. Moreover, this is accomplished with only one scan of the document. The document is divided into a number of regions of equal area and each of these regions is scanned by a fiber optic. Also, other fiber optics scan one-half of the area of a region and its contiguous region. The outputs of all these fiber optics are monitored by photocells which produce an output when 50 percent or more of the area scanned by its respective fiber optic contains a line. The outputs of the two photocells monitoring two regions contiguous in a first direction and the one photocell monitoring areas common to the two contiguous regions are combined by a data compactor. This data compactor produces an output insuring that the data contents of these three photocells will not be lost.

The above two contiguous areas lie in one direction, preferably in a direction perpendicular to the scan of the scanning head containing the fiber optics. The scanning head produces another output after it has been indexed a distance equal to one-half the width of a region. The three outputs produced by the compactor for contiguous regions lying in the scanning direction are monitored by a second compactor which produces an output representative of the information contained therein. This output is recorded in an ordered relationship with outputs representing areas scanned before and after the area which is represented by this output. Thus, the document can be reconstructed later, by playing back the recorded outputs in the same order that they were recorded. As will be more fully shown further on, each output of the data compactor represents four regions. Thus, a compression of 4:1 over the prior art is achieved.

More particularly, the preferred embodiment of the invention scans a lined document. Examples of such documents are maps, flow charts, topographical studies, etc. The preferred embodiment of the invention described assumes that all lines have a mean width of at least 4 mils and, except for intersecting lines, are at least 4 mils apart. However, this is only an example, and any other size lines are possible, recognizing that as the head width to line width ratio changes, so does the reliability. By the preferred one to one ratio between head and line width the invention allows scanning 4 mil lines with 4 mil square scan regions (i.e. scan heads composed of fiber optics of 4 mils square) without error even with the possibility that a line might not be 4 mils wide due to inking error, reproduction error, etc. Without the invention unacceptable errors would occur. Scanning in the preferred embodiment is accomplished by two sets of fiber optics receiving light reflected off the document through a diachroic mirror.

In the preferred embodiment the fiber optics are arranged in two sets so that each set scans a rectangular area whose longer axis is in the direction perpendicular to the scan direction. The scan direction being the direction in which the scan head is indexed relative to the document as will be explained hereinafter in more detail. Each fiber optic scans a 4 mil square region. The fiber optics in the first fiber optic set scan contiguous regions in the rectangular scan area. The fiber optics in the second set scan contiguously regions, with the area scanned by each fiber optic being composed of one-half the area of each of two contiguous regions scanned by the first fiber optic set.

The outputs of the fiber optics are sensed by photocells whose outputs are amplified and fed to the data compactor. After the scanning heads have been indexed in the scan direction a distance equal to one-half the width of a region (in the preferred embodiment 2 mils) another output is gated from the photocells into the data compactor.

The data compactor consists of two compactors. The first compactor examines the outputs of the fiber optics in the direction perpendicular to the scan direction. Basically, it works on units of two regions and examines the three photocells which scan those regions, i.e. the two photocells which scan the entire area of those regions and the one photocell which scans the area common to those two regions. An output is produced which insures that the data contained within these regions will not be lost.

The second compactor examines the outputs of the first compactor so as to compact the data for the contiguous regions lying in the direction of scan. That is, the second compactor examines three outputs, two when the scan head is directly aligned with a region and one when the scan head is aligned such that it covers one-half of the area of each two regions contiguous in the scan direction. The second compactor produces an output representative of the information contained in the output of the first compactor insuring that the information contained therein is not lost.

Since the first compactor effectively produces one output for every two regions, and the second compactor produces one output for every two outputs of the first compactor, the output of the second compactor represents the information contained in four regions. Thus, the invention compacts data at a ratio of 4:1, and simultaneously insures that no line on the document goes undetected.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 6 is a compilation of charts used in the description of the invention.

DESCRIPTION OF FIG. 1

Figure 1:
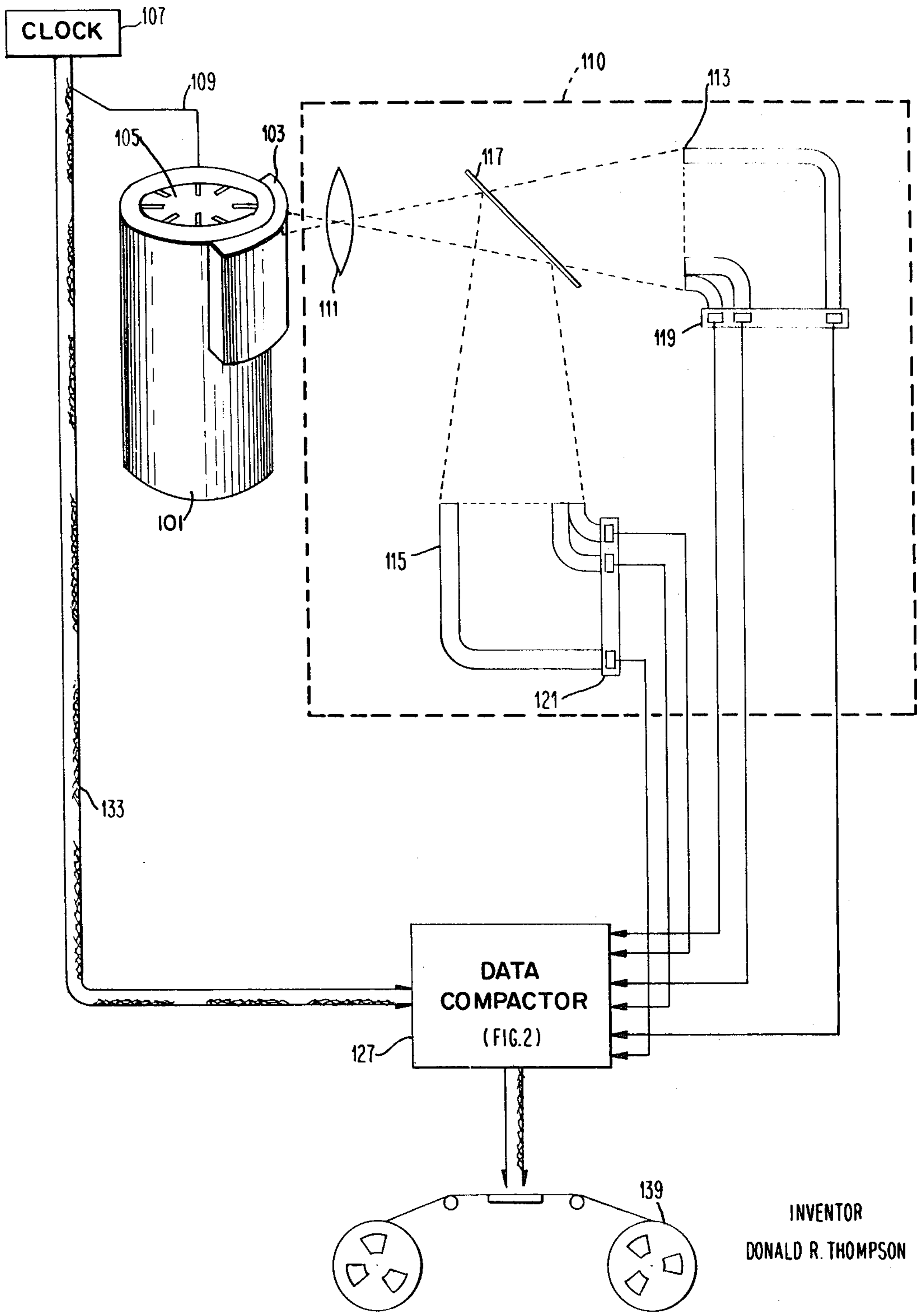
FIG. 1 is a drawing of the preferred embodiment of the invention.
Figure 3:
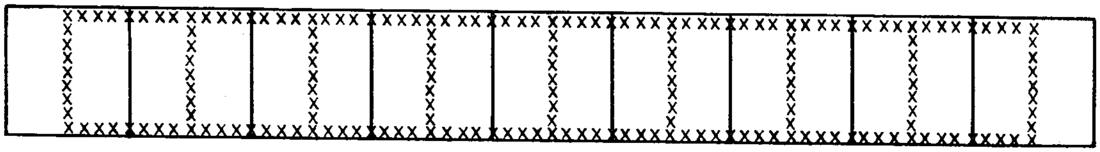
FIG. 3 is an illustration of the area scanned by fiber optic sets 113 and 115 of FIG. 1.

Illustrated in FIG. 1 is the preferred embodiment of the invention. Briefly, according to the preferred embodiment, in the scanning means drum 101 carries a document 103. Drum 101 is forced to rotate by a motor (not shown) under the control of shaft encoder 105 which in turn is controlled by clock 107 through line 109. Drum 101 is scanned by an optically scanning means 110. In the preferred scanning means 110 the image of document 103 is focused by lens 111 on fiber optics sets 113 and 115 through dichroic mirror 117. Both fiber optics sets 113 and 115, forming one scanning means apiece, scan on the same horizontal line but are displaced in that direction by the width of one-half the diameter of a fiber optic. This is seen more clearly from FIG. 3 where the area scanned by fiber optic set 113 is outlined in dark lines and the area scanned by fiber optic set 115 is outlined in cross (x) marks. Fiber optic set 113 contains one more fiber optic than does fiber optic set 115. (In the preferred embodiment 9 fiber optics are in fiber optic set 113 and 8 fiber optics are in fiber optic set 115. Also, in the preferred embodiment each fiber optic is 4 mils square, thus each fiber optic scans a region of 16 square mils and fiber optic set 113 scans an area of 4 mils by 36 mils.) Each photocell in photocell sets 119 and 121 indicate whether the region with which they are associated contains a line or not, i.e. current flows (a logical one) if there is a line and no current flows (a logical zero) if there is no line. After drum 101 has completed one rotational scan, the scanning system 110 is indexed laterally in order that the region scanned by the last fiber optic in set 113 will be scanned by the first fiber optic in fiber optic set 113 during the subsequent rotational scan.

Figure 2:
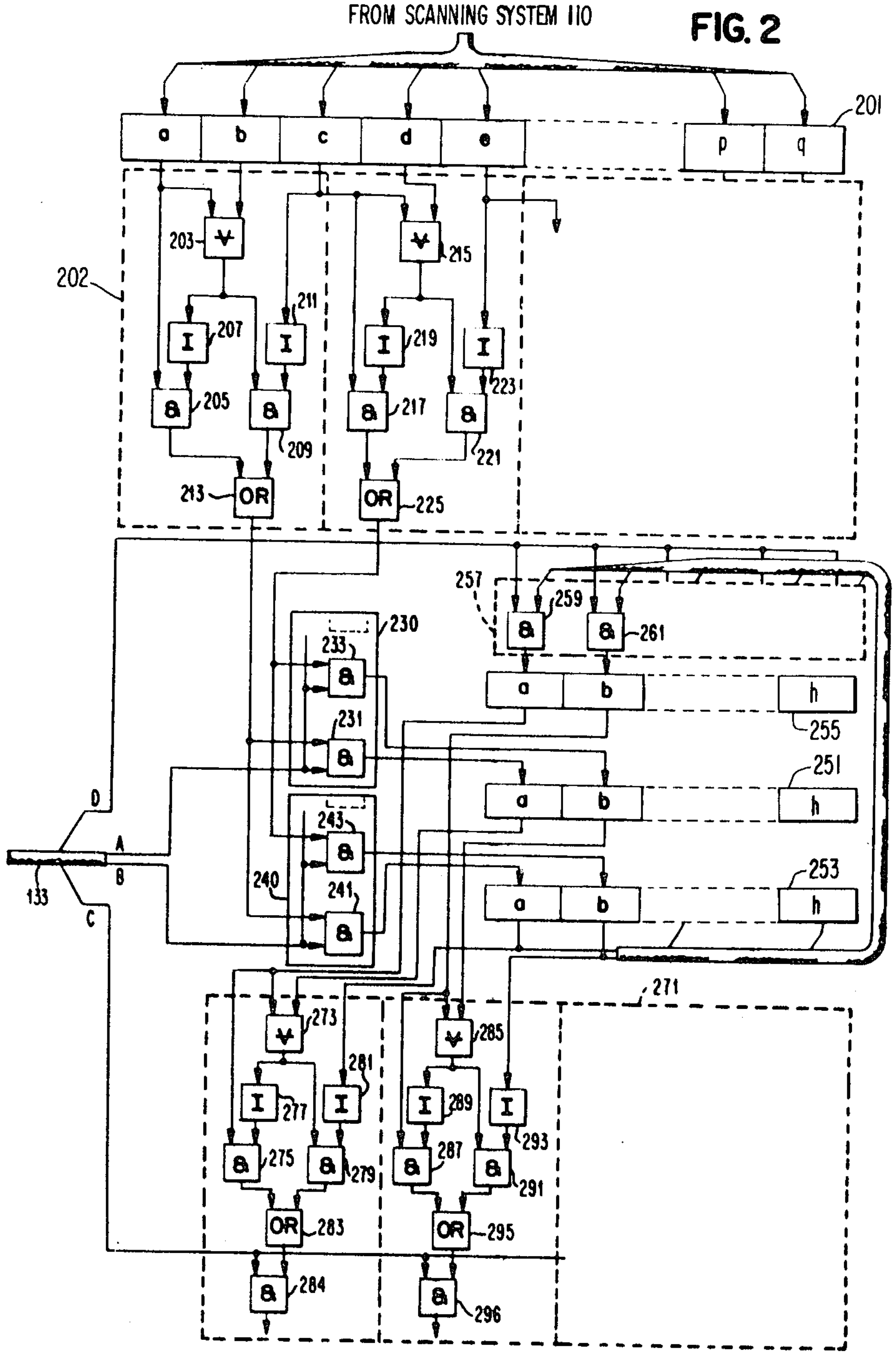
FIG. 2 is a more detailed description of data compactor 127 of FIG. 1.

The outputs of photocells 119 and 121 scanning the document 123 are combined to form the input to data compactor 127 (more fully shown in FIG. 2). Clock 107 provides timing signals, depending on the position of the drum 101 to scanning system 110, through cable 133 to data compactor 127. The output of data compactor 127 forms an input to tape unit 139 where the compacted data is written onto tape. (It is recognized that the compacted data could be stored on other means, such as paper tape, magnetic core storage, etc.)

The operation of the circuit illustrated in FIG. 1 will be better understood after the detailed description of FIG. 2 and the subsequent example.

DESCRIPTION OF FIG. 2

In FIG. 2 the preferred embodiment of the data compactor is illustrated. The outputs from scanning system 110 form the inputs to the individual stages of register 201. In the preferred embodiment register 201 contains 17 stages, one for each photocell in photocell sets 119 and 121. All photocells from the two sets are connected to the stages of register 201 in an interleaved fashion, with each photocell of set 119 being connected to only one of the register stages *a, c, e, g, i, k, m, o,* or *q*, and each photocell from set 121 being connected to only one of the register stages *b, d, f, j, k, l, n,* or *p*. Further each photocell in set 121 is positioned so that it scans an area which is overlapped by the areas scanned by two adjacent photocells in set 119. To efficiently use the information resulting from the overlapping scan, all photocells are connected to register 201 in an overlapping fashion, with photocell in set 121 being connected to a register stage which is adjacent to both stages to which the corresponding overlapping photocells from set 119 are connected.

The logic illustrated in FIG. 2 is shown for only the first five stages of register 201. It will become obvious from the following discussion that the completion of the logic diagram is only a mere duplication of the circuit already illustrated, and the missing stages are deleted from FIG. 2 for purposes of clarity. The output of the first stage of register 201 forms an input to both Exclusive-OR 203 and AND circuit 205. The other input to Exclusive-OR 203 is formed by the output from the second stage of register 201. The output of Exclusive-OR 203 forms the input to Inverter 207 and an input to AND 209. The output of Inverter 207 forms the other input to AND circuit 205. The logic associated with the first three stages of register 201 is completed by Inverter 211 which inverts the output of the third stage, 201*c*, and whose output forms the other input to AND circuit 209. The outputs of AND circuit 205 and 209 form the inputs to OR circuit 213.

The output of OR circuit 213 forms an input of AND circuit 231 and AND circuit 241. The output of OR circuit 225 forms an input to AND circuit 233 and AND circuit 243. Similarly, each functional logic circuit output of circuitry 202 forms an input to both an AND circuit in circuitry block 230 and circuitry block 240. The other input for the AND circuits in circuitry block 230 is formed by timing line 133A, a line contained in cable 133 from clock 107. The other input to the AND circuits contained in circuitry block 240 is timing line 133B, a line contained in cable 133 from clock 107. The outputs from each AND circuit of circuitry block 230 forms an input to a stage of register 251. Similarly, the output from each AND circuit of circuitry block 240 forms an input to register 253. More specifically, the output of AND circuit 231 forms the input for stage 251*a*, the output of AND 233 forms the input for stage 251*b*, the output of AND 241 forms the input for stage 253*a*, and the output of AND 243 forms the input to stage 253*b*, The stages of register 253 form inputs both to circuitry block 271 and circuit block 257. Referring to the latter circuitry block each stage of shift register 253 is associated as an input to one AND circuit in circuitry block 257. That is, stage 253*a* forms an input to AND circuit 259, the output from stage 253*b* forms an input to AND circuit 261, etc. The other input to each of the AND's in circuitry block 257 is formed by the D timing signal, a line in cable 133.

Referring now to circuitry block 271, it is seen that it is made up of the same logical blocks as is circuitry block 202. That is, circuits 272–283 are identical in composition and connection as are circuits 203–213. Therefore, no further description of the separate functional blocks of circuitry block 271 will be given except that the outputs of each of the final OR's in each functional block forms an input to an AND circuit so as to gate the final outputs of the data compactor in FIG. 2. That is, the output of OR circuit 283 forms an input to AND circuit 284, the output of OR circuit 295 forms an input to AND circuit 296, etc. The other input of the final AND circuits in circuitry block 271 is formed by timing signal C, a line in cable 133.

OPERATION OF FIG. 2

Circuitry 203–213 examines the first three stages of register 201 and produces an output logically identical to stage 201*a* if stages 201*a* and stages 201*b* are logically identical. If the latter two stages are not logically identical, the output of circuitry 203–213 is a logical inverse of stage 201*c*.

Similarly, circuitry 215–225 performs the identical function with respect to stages 201*c*, *d*, and *e* as did circuitry 203–213 with respect to stages 201*a–c*. By examining the pattern exhibited by the above-described circuitry, a single output is produced from logic circuitry 202 for every two inputs from stages of register 201. Thus, logic circuitry 202 reduces the data in register 201 by half. As also can be seen from the above description the bit of data contained in stage 201*q* may be needed to correctly determine the data output which is to replace the contents of stages 201*o* and *p*. As was explained in the description of FIG. 1 the scanning network composed of drum 101, lens 111, etc. overlaps one square scan area during every cycle. Thus, the contents of stage 201*q* will be identical to the contents of stage 201*a* when the drum assumes the same angular position during the next cycle. One skilled in the art will see that upon the occurrence of a timing signal on line 133A the logical conditions contained on the outputs from circuitry block 202 will be loaded into register 251. Similarly, upon the occurrence of a timing signal on line 133B the logic conditions then on the outputs of circuitry block 202 will be loaded into register 253. Upon the occurrence of a timing signal on line 133D, the contents of register 255 will assume the same values as that contained in register 253.

The function of circuitry block 271 is the same as that of circuitry block 202. Further examination will show that as circuitry block 202 reduced two stages of register 201 to one signal by examining those two stages and the following stage, so does circuitry block 271 reduce comparable stages of register 251 and register 253 to one data bit by examining those two registers with the comparable stages of register 255. The final output of circuitry block 271, and the final output of the data compactor in FIG. 2, as gated by timing line 133C.

EXAMPLE

Figure 5:
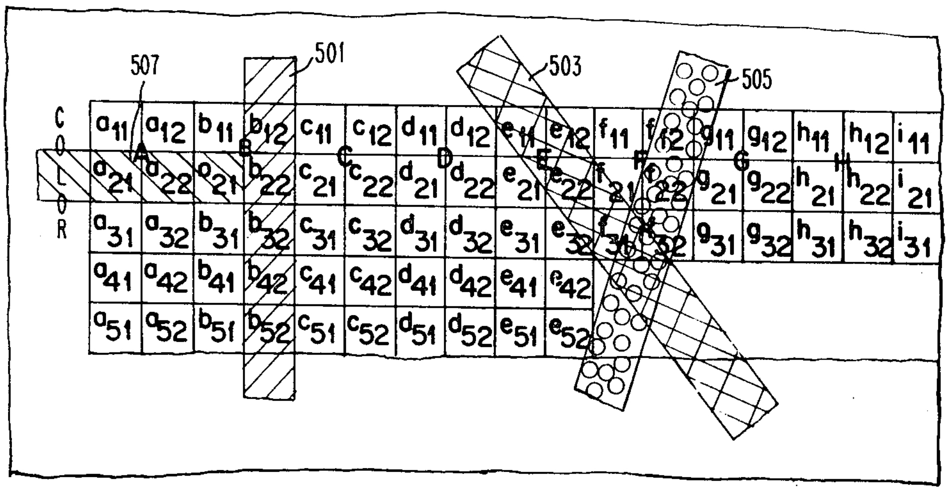
FIG. 5 is an illustration of a section of a typical document scanned by the invention.

Referring to FIG. 5 a sample document to be scanned is illustrated. The area of concern consists of four lines, lines 501, 503, 505, and 507. For ease of reference the area delineated by the regions $a_{11}$, $a_{12}$, $a_{21}$, and $a_{22}$ will be labeled A. Similarly, the area delineated by the regions $b_{11}$, $b_{12}$, $b_{21}$, and $b_{22}$ will be delineated B; and so forth for C, D, E, F, G, and H.

During the first scan fiber optic set 113 covers the area delineated from $a_{11}$ to $e_{11}$; fiber optic set 115 covers the area from the second half of $a_{11}$ to the first half of $e_{11}$. Each fiber optic in optics sets 113 and 115 transmits the reflected light into detectors 119 and 121, respectively. When drum 101 is correctly aligned so that the line $a_{11}$ through $e_{11}$ on document 103 is correctly aligned with scanning system 110, a timing phase occurs on line 133B. At this time the outputs from photocells 119 associated with fiber optic set 113 will be 0, 0, 0, 1, 0, 0, 0, 0 and 1 for regions $a_{11}$ through $e_{11}$ and the outputs from photocells 121 associated with fiber optic set 115 will be 0, 0, 1, 0, 0, 0, 0, 0. Notice that the second fiber optic of fiber optics set 115 scans the second half of region $b_{11}$ and the first half of region $b_{12}$. Thus, one half of the area scanned will contain a line and the output could be either 0 or 1. Because of the invention no matter which output is produced, the correct indication will be produced by data compactor 127. The same is true for the last fiber optic of fiber optic set 115.

Each of the functional blocks in circuitry block 202 will perform the logical function as described above. That is, the output from OR 213 will be a logical 0, that from 225 will be a logical 0, etc. This description is summarized in chart 1. Notice that if the second and third photocells of photocells 121 changed output, the output of circuit block 202 would not be changing. This illustrates the point made above in the case where a fiber optic could either detect or not detect a line because the line covers approximately one-half of the area scanned.

Figure 4:
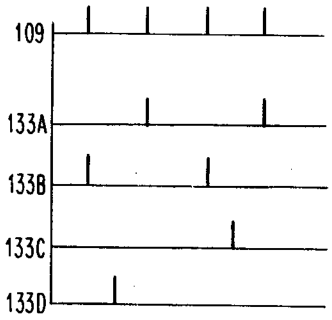
FIG. 4 is a timing diagram for FIG. 1.

Upon the occurrence of the above-mentioned timing pulse on line 133B the outputs of circuitry block 202 will be loaded into register 253. Referring to the timing diagram in FIG 4 it is seen that a timing pulse occurs on line 109 indicating that drum 101 is aligned and a simultaneous timing pulse occurs on line 133B. Shortly thereafter a timing pulse appears on line 133D causing register 255 to assume the state of register 253 (i.e. line $a_{11}, a_{12}, \ldots, e_{11}$).

Similarly, when another timing pulse 109 occurs indicating that one-half of row $a_{11}, a_{12}, \ldots, e_{11}$ and one-half of row $a_{21}, a_{22}, \ldots, e_{21}$ is aligned with the fiber optics a timing pulse 133A occurs. This causes the states of register 251 to assume the logical conditions 1, 1, 1, etc. See chart 2 for a summarization. Lastly, another timing pulse occurs on 109 and 133B causing register 253 to assume logical configuration of row $a_{21}, a_{22}, \ldots, e_{21}$; see chart 3.

The outputs from each of the functional blocks of circuitry block 271 produce an output which upon the occurrence of a timing pulse on line 133C presents an input to the tape unit 139. As mentioned above and as can be seen from FIG. 2, circuitry block 271 combines the contents of register 255, 251, and 253. These registers have assumed the condition shown in chart 4. The eight outputs from circuitry block 271 are shown in the last line of chart 4.

Similarly, the scanning network continues to scan mixed scanning row $a_{31}, a_{32}, \ldots, e_{31}$, etc. to complete a rotational scan of the document. The state of registers 255, 251, and 253 are shown in chart 5.

During the next rotational scan row $e_{11}, e_{12}, \ldots, i_{11}$ will be scanned. After row $e_{21}, e_{23}, \ldots, i_{21}$ has been scanned registers 251–255 will assume the configuration shown in chart 6; and the output of circuitry block 271 will also be as shown.

A further problem may be seen that in area B an ambiguity might arise from the intersecting lines. That is, which line goes in which direction. This would cause line 507 to overlap line 501, whereas in reality they abut in the middle of B. These dicodimies are solved by a technique called "line following" through programming on a computer. That is, the information stored on tape as encoded by data compactor 127 is read off by a computer, which controls a line plotter. Before the plotter is given information, the computer scans for any dicodimies such as exist in area B and area F. For more information on this subject see Roger F. Tomlinson, "Introduction to the Geographic Information of the Canadian Land Inventory," ASP/ACFM, Washington, DC, Mar. 7, 1967.

While the invention has been particularly shown and described with reference to a preferred embodiment, it will be understood by those skilled in the art that the foregoing suggested and other changes in form and details may be made without departing from the spirit and scope of the invention.

What is claimed is:

1. A data encoder which compacts the data necessary for permanently recording information representing the lines on a document including:

scanning means for scanning contiguous regions of a document in a first direction;

second scanning means scanning contiguous regions over the same area in the same direction as scanned by said first scanning means and encompassing one-half of the area from each of two contiguous regions scanned by said first scanning means;

first comparing means receiving the output of said scanning means and producing outputs, each output representative of the information content of a region group formed by two contiguous regions scanned by said first scanning means and in the region contained area common to both of said two regions scanned by said second scanning means;

storage means receiving the outputs of said first comparing means and storing those outputs, each of said outputs representing two regions scanned by said first scanning means and contiguous to each, and indicating whether a line is present or not present in those regions on the scanned document.

2. A data encoder which compacts the data necessary for permanently recording information representing the lines on a document including:

scanning means for scanning contiguous regions of a document in a first direction;

second scanning means scanning contiguous regions over the same area in the same direction as scanned by said first scanning means and encompassing one-half the area from each of two contiguous regions scanned by said first scanning means;

first comparing means receiving the output of said scanning means and producing outputs, each output representative of the information content of a region group formed by two contiguous regions scanned by said first scanning means and the region contained area common to both of said two regions scanned by said second scanning means;
second comparing means receiving the outputs of said first comparing means and producing outputs, each output representative of the information content of the outputs of said first comparing means for three successive region groups the first and third of which are contiguous in a direction perpendicular to said first direction and the second of which overlaps a portion of the first and third regions;
storage means receiving the outputs of said second comparing means and recording those outputs, each of said output representing four regions, each contiguous to each other at least at one point, scanned by said first scanning means, and indicating whether a line is present or not present in those regions on the scanned document.

3. A device as in claim 2 wherein:
both said first and second comparing means produce a first type output when the first two of each set of three inputs are of a first type, or one of the first two inputs is of the first type and the other is of a second type and the third input is of the second type, and produce a second type output in all other cases.

4. A device as in claim 3 wherein said scanning means scan regions of equal area.